US009354660B2

(12) United States Patent
     Sato

(10) Patent No.: US 9,354,660 B2
(45) Date of Patent: May 31, 2016

(54) ELECTRONIC DEVICE

(71) Applicant: Kabushiki Kaisha Toshiba, Minato-ku, Tokyo (JP)

(72) Inventor: Yuki Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 14/272,258

(22) Filed: May 7, 2014

(65) Prior Publication Data
    US 2015/0049434 A1  Feb. 19, 2015

Related U.S. Application Data

(60) Provisional application No. 61/867,468, filed on Aug. 19, 2013.

(51) Int. Cl.
    *H05K 5/00*  (2006.01)
    *G06F 1/16*  (2006.01)
(52) U.S. Cl.
    CPC .................................. *G06F 1/1626* (2013.01)
(58) Field of Classification Search
    CPC ..... G06F 1/1626; G06F 1/1658; G06F 1/181; G06F 1/183; H05K 5/0217
    See application file for complete search history.

(56) References Cited

U.S. PATENT DOCUMENTS 7,361,428 B2 * 4/2008 Watanabe ........... H01M 2/1061
                                                    429/7

FOREIGN PATENT DOCUMENTS

| JP | 02-255394 A | 10/1990 |
| JP | 06-047780 Y2 | 12/1994 |
| JP | 2012-502355 A | 1/2012 |
| WO | WO 2010/027565 | 3/2010 |

* cited by examiner

*Primary Examiner* — Robert J Hoffberg
*Assistant Examiner* — Hung Dang
(74) *Attorney, Agent, or Firm* — Knobbe, Martens, Olson & Bear, LLP

(57) ABSTRACT

According to one embodiment, an electronic device includes a first member, a second member, and a third member. The first member includes: a first end; a second end; an opening opened on the first end and on the second end; a first support protruding from an inner circumferential face of the opening and including a first face facing toward the first end; and a second support protruding from the inner circumferential face at a position nearer to the second end than the first support, including a second face facing toward the second end portion, and being at a position offset from the first support in a direction from the first end toward the second end. The second member is supported by the first face of the first support. The third member is supported by the second face of the second support.

19 Claims, 11 Drawing Sheets

ELECTRONIC DEVICE

FIELD

Embodiments described herein relate generally to an electronic device.

BACKGROUND

There are some cases in which a housing of an electronic device is made from a plurality of parts.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic device comprises a first member, a second member, and a third member. The first member comprises: a first end; a second end positioned on an opposite side of the first end; an opening configured to open to the first end and to the second end; a first support configured to protrude from an inner circumferential face of the opening and comprising a first face facing toward the first end; and a second support configured to protrude from the inner circumferential face of the opening at a position nearer to the second end than the first support, comprising a second face facing toward the second end portion, and being at a position offset from the first support in a direction from the first end toward the second end. The second member is configured to be supported by the first face of the first support. The third member is configured to be supported by the second face of the second support.

A first embodiment will now be explained with reference to FIGS. 1 to 4. In the descriptions hereunder, a plurality of expressions are sometimes listed to refer to or explain some element according to the embodiment. Such an element or explanation may be expressed in any way other than those mentioned in the description hereunder. Furthermore, an element or an explanation for which a plurality of expressions are not mentioned may also be expressed in any other ways.

Figure 1:
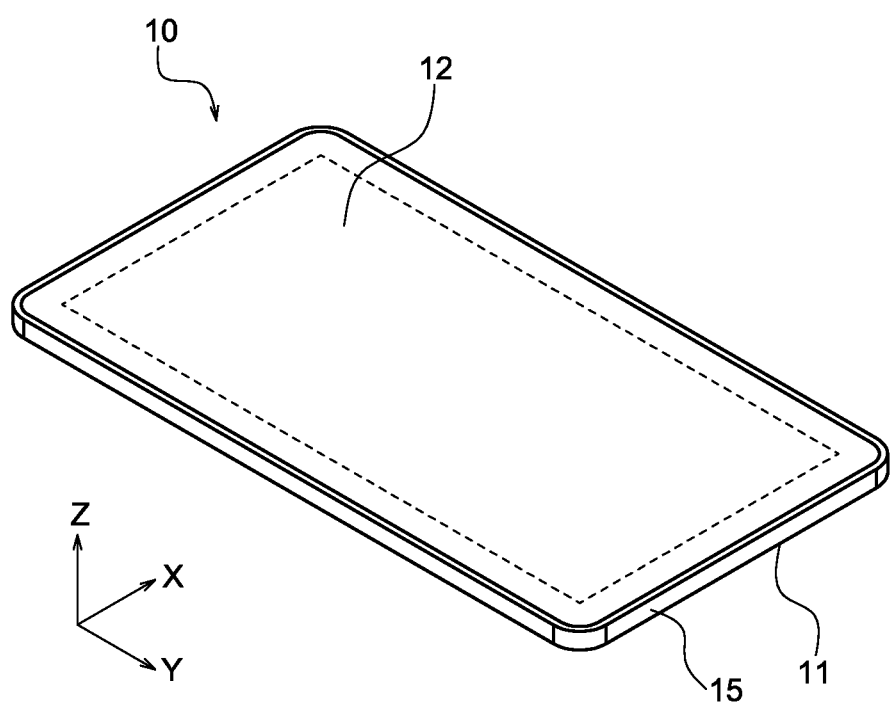
FIG. 1 is an exemplary perspective view illustrating a tablet according to a first embodiment.
Figure 2:
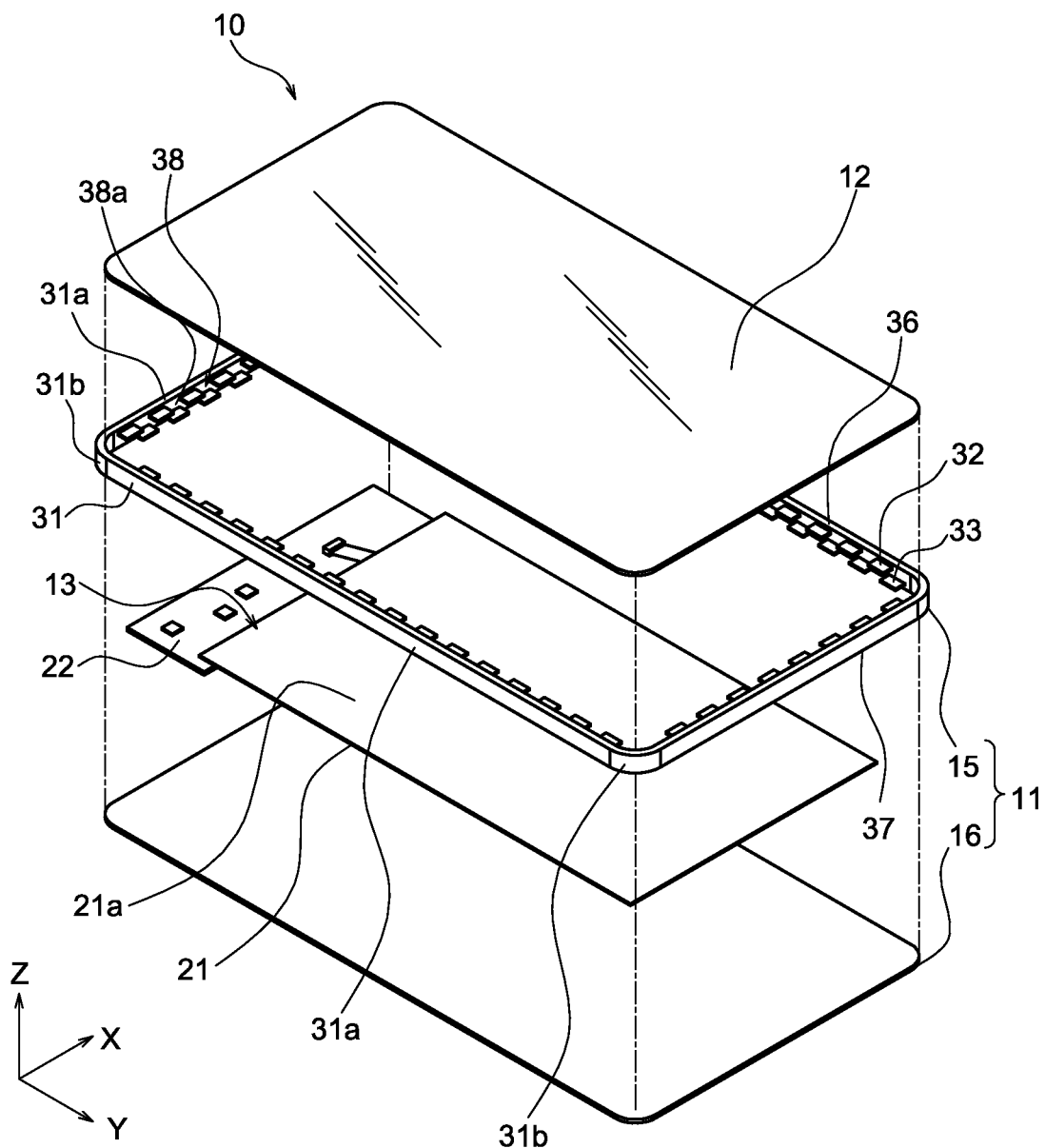
FIG. 2 is an exemplary exploded perspective view illustrating the tablet in the first embodiment.

FIG. 1 is a perspective view illustrating a tablet terminal (hereinafter, referred to as a tablet) 10 according to the first embodiment. FIG. 2 is an exploded perspective view illustrating the tablet 10. The tablet 10 is an example of the electronic device. The tablet 10 may also be referred to as a tablet personal computer (PC) or a slate PC, for example.

In the description provided herein, an X axis, a Y axis, and a Z axis are defined, as illustrated in the drawings. The X axis extends along the width of the tablet 10. The Y axis extends along the length of the tablet 10. The Z axis extends along the thickness of the tablet 10. The longitudinal direction of the tablet 10 is a direction extending along the Y axis, and the short side direction of the tablet 10 is a direction extending along the X axis.

As illustrated in FIGS. 1 and 2, the tablet 10 comprises a housing 11, a protection panel 12, and a module 13. The protection panel 12 is an example of the second member, and may also be referred to as a panel, a wall, a lid, or a covering portion, for example. The housing 11 comprises a frame member 15 and a base member 16. The frame member 15 is an example of the first member, and may also be referred to as a member, a side wall, a wall portion, or an intermediate portion, for example. The base member 16 is an example of the third member, and may also be referred to as a panel, a wall, a lid, or a covering portion, for example.

As illustrated in FIG. 2, the module 13 is housed in a space formed in the housing 11 and the protection panel 12 that are fitted together. The module 13 comprises a display 21, a printed circuit board 22, a battery, and other various components.

The display 21 may also be referred to as a displaying part or an image forming module, for example. The display 21 is a flexible display such as a polymer organic light emitting diode (P-OLED) display or a plastic liquid-crystal display (P-LCD). The display 21 is not limited thereto, and may also be other device for displaying images, such as a liquid-crystal display (LCD), a plasma display, and an electronic paper. The display 21 may also be an in-cell touch panel, or a touch panel may be deposited on the display 21.

The display 21 is a plate-like component having a screen 21a. The display 21 displays an image on the screen 21a. Examples of an "image" herein include a video, a still image, and a monochromatic image.

The printed circuit board 22 is a printed wiring board on which various components, such as a microprocessor unit (MPU), a memory, a capacitor, and a connector, are implemented. The printed circuit board 22 is connected to the display 21 over a cable.

The frame member 15 is made of magnesium alloy, for example. The frame member 15 may be made of other metals such as aluminum alloy, or other materials such as synthetic resin. The frame member 15 has a circumferential wall 31, a first support portion 32, and a second support portion 33. The circumferential wall 31 may also be referred to as a wall portion, a wall, or a side wall, for example. The first support portion 32 is an example of a first support, and the second support portion 32 is an example of a second support. The first support portion 32 and the second support portion 33 may also be referred to as protruding portions, protruding pieces, attaching portions, fixing portions, flanges, tabs, or ribs, for example.

The circumferential wall 31 has a substantially quadrangular frame-like shape. In other words, the circumferential wall 31 has four quadrangular plate portions 31a and four corner portions 31b each of which is positioned between the two adjacent plate portions 31a.

The circumferential wall 31 is provided with a plurality of cutouts. Various types of components, e.g., an external input-output (I/O) port such as a universal serial bus (USB) connector, an earphone jack, and a power connector, are exposed from these cutouts. These components are provided to the printed circuit board 22 in the module 13.

The circumferential wall 31 also has a first end portion 36 and a second end portion 37. The first end portion 36 is an example of a first end, and the second end portion 37 is an example of a second end. The first end portion 36 and the second end portion 37 are the ends of the circumferential wall 31 in the Z axis direction. The circumferential wall 31 also has an opening portion 38. The opening portion is an example of a opening. The opening portion 38 may also be referred to as an inside portion, a container portion, or a storage portion, for example. The first end portion 36 and the second end portion 37 are the ends of the circumferential wall 31 in the width direction. The second end portion 37 is positioned on the opposite side of the first end portion 36.

Figure 3:
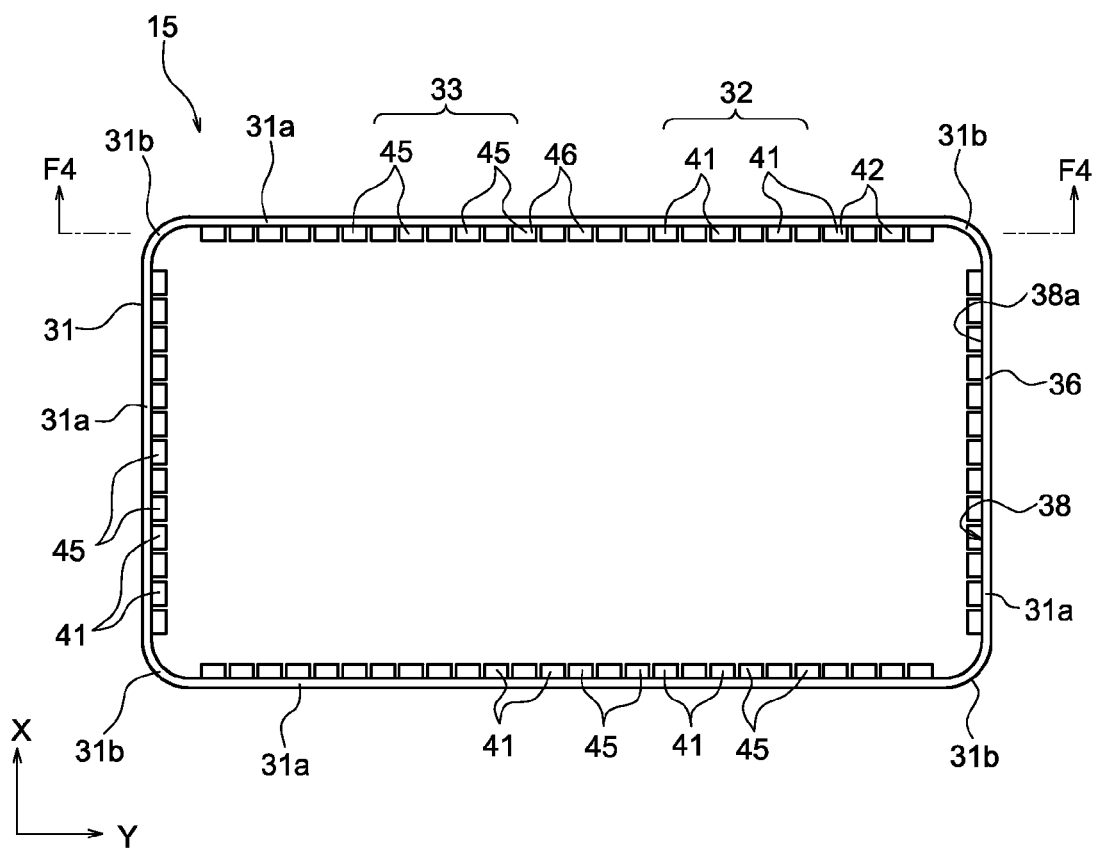
FIG. 3 is an exemplary plan view illustrating a frame member in the first embodiment.
Figure 4:
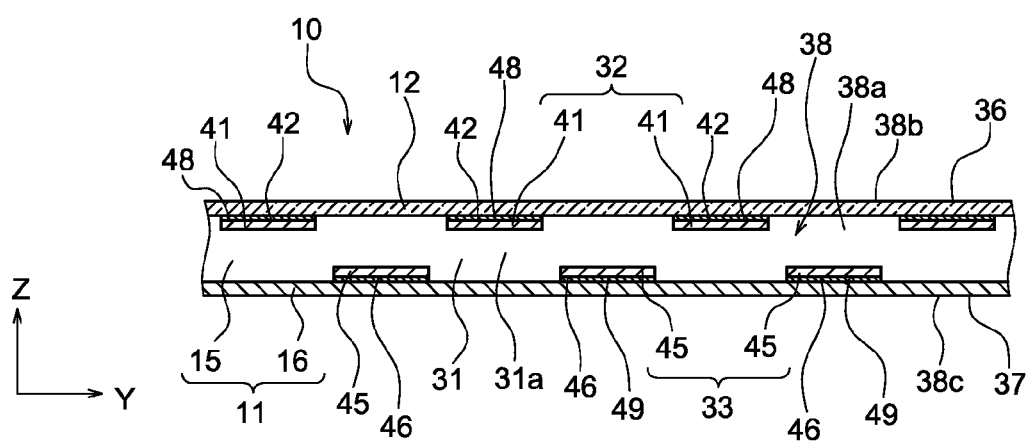
FIG. 4 is an exemplary cross-sectional view illustrating a portion of the tablet taken along a line F4-F4 in FIG. 3, in the first embodiment.

FIG. 3 is a plan view illustrating the frame member 15. FIG. 4 is a cross-sectional view illustrating a portion of the tablet 10 taken along the line F4-F4 in FIG. 3. As illustrated in FIG. 3, the opening portion 38 is defined by the inner surface of the circumferential wall 31. In other words, the inner surface of the circumferential wall 31 forms the inner circumferential face 38a of the opening portion 38. Therefore, the opening portion 38 is a hole having a substantially quadrangular shape. The shape of the opening portion 38 is not limited thereto. For example, the opening portion 38 may be a circular hole. Furthermore, the opening portion 38 is a hole extending straightly along the Z axis, but the opening portion 38 may also be a tapered hole, or may become thinner or wider along the Z axis, for example.

As illustrated in FIGS. 2 and 4, the opening portion 38 opens to the first end portion 36 and the second end portion 37 of the circumferential wall 31. In other words, the opening portion 38 forms a first edge 38b on the first end portion 36, and forms a second edge 38c in the second end portion 37. The first edge 38b and the second edge 38c are two edges on the opening portion 38.

The first support portion 32 comprises a plurality of first supporting pieces 41. The first supporting pieces 41 may also be referred to as protrusions, protruding pieces, attaching portions, fixing portions, flanges, tabs, or ribs, for example. The first supporting pieces 41 are provided on the plate portions 31a of the circumferential wall 31, and protrude from the inner circumferential face 38a of the opening portion 38. The first supporting pieces 41 may be provided at the corner portions 31b of the circumferential wall 31. Each of the first supporting pieces 41 has a quadrangular plate-like shape, but may also have other shapes such as a trapezoid.

Each of the first supporting pieces 41 has a first supporting face 42. Each of the first supporting faces 42 is an example of the first face, and is a flat surface facing the first end portion 36 of the circumferential wall 31. To explain more specifically, each of the first supporting faces 42 faces the end (exit) of the opening portion 38 provided on the first end portion 36. Each of the first supporting faces 42 is a surface perpendicular to the Z axis (a direction in which the opening portion 38 extends). Alternatively, each of the first supporting faces 42 may intersect with the Z axis diagonally, and may have recesses or protrusions. The first supporting faces 42 of the respective first supporting pieces 41 are positioned on the same plane. Each of the first supporting faces 42 is provided in a manner substantially perpendicular to the inner circumferential face 38a of the opening portion 38, but the first supporting face 42 may also intersect with the inner circumferential face 38a diagonally.

The second support portion 33 comprises a plurality of second supporting pieces 45. The second supporting pieces 45 may also be referred to as protrusions, protruding pieces, attaching portions, fixing portions, flanges, tabs, or ribs, for example. The second supporting pieces 45 are provided on the plate portion 31a of the circumferential wall 31, and protrude from the inner circumferential face 38a of the opening portion 38. The second supporting pieces 45 may also be provided on the corner portions 31b of the circumferential wall 31. Each of the second supporting pieces 45 has a quadrangular plate-like shape, but may also have other shapes such as a trapezoid.

As illustrated in FIG. 4, the second supporting pieces 45 are positioned nearer to the second end portion 37 of the circumferential wall 31 than the first supporting pieces 41. The first supporting pieces 41 are positioned near the first end portion 36, and the second supporting pieces 45 are positioned near the second end portion 37. The distance between the first supporting pieces 41 and the first end portion 36 is almost equal to the thickness of the protection panel 12. The distance between the second supporting pieces 45 and the second end portion 37 is almost equal to the thickness of the base member 16. However, the distance between the first supporting pieces 41 and the first end portion 36 and the distance between the second supporting pieces 45 and the second end portion 37 are not limited thereto. The module 13 can be positioned between the first supporting pieces 41 and the second supporting pieces 45.

Each of the second supporting pieces 45 has a second supporting face 46. Each of the second supporting faces 46 is an example of the second face, and is a flat surface facing the second end portion 37 of the circumferential wall 31. To explain more specifically, each of the second supporting faces 46 faces the end (exit) of the opening portion 38 provided on the second end portion 37. Each of the second supporting faces 46 is a surface perpendicular to the Z axis (the direction in which the opening portion 38 extends). Each of the second supporting faces 46 may intersect with the Z axis diagonally, or may have recesses or protrusions. The second supporting faces 46 of the respective second supporting pieces 45 are positioned on the same plane. Each of the second supporting faces 46 is provided in a manner substantially perpendicular to the inner circumferential face 38a of the opening portion 38, but may also intersect with the inner circumferential face 38a diagonally.

Both of the first supporting pieces 41 and the second supporting pieces 45 extend in the circumferential direction of the opening portion 38. The first supporting faces 42 are in parallel with the second supporting faces 46. Each of the first supporting pieces 41 or each of the second supporting pieces 45 and the circumferential wall 31 form a substantially T-shaped cross section.

The first supporting pieces 41 and the second supporting pieces 45 are arranged alternatingly along the circumferential direction of the opening portion 38. The arrangement of the first supporting pieces 41 and the second supporting pieces 45 are not limited thereto. For example, the first supporting pieces 41 or the second supporting pieces 45 may be arranged successively along the circumferential direction of the opening portion 38. Furthermore, the first supporting pieces 41 and the second supporting pieces 45 may be different in number, size, or shape, for example.

The second supporting pieces 45 are provided at positions offset from the first supporting pieces 41, respectively, in the direction from the first end portion 36 toward the second end portion 37 (the width direction of the circumferential wall 31, the direction in which the opening portion 38 extends, the direction extending along the Z axis). In other words, the first supporting pieces 41 do not overlap with the second supporting pieces 45, and are offset from the second supporting pieces 45 in the width direction of the circumferential wall 31 (the direction in which the opening portion 38 extends, the direction extending along the Z axis). The first supporting pieces 41 may partially overlap with the second supporting pieces 45.

A first double-sided adhesive tape 48 is stuck on each of the first supporting face 42. The first double-sided adhesive tape 48 may also be referred to as an adhesive portion, an adhesive layer, a buffering portion, or an interposed portion, for example. Alternatively, the double-sided adhesive tape may be stuck across the first supporting faces 42, or an adhesive agent may be applied on the first supporting faces 42.

The first supporting faces 42 of the respective first supporting pieces 41 support the protection panel 12 via the first double-sided adhesive tape 48. The front surface of the protection panel 12 supported by the first supporting faces 42 is a surface substantially perpendicular to the Z axis, but may intersect with the Z axis diagonally. The protection panel 12 is bonded to the first supporting faces 42 by the first double-sided adhesive tape 48. Alternatively, the protection panel 12 may be fixed to the first supporting faces 42 by other means. Furthermore, the protection panel 12 may also be fixed to the inner circumferential face 38a of the opening portion 38. The front surface of the protection panel 12 and the first end portion 36 of the circumferential wall 31 are positioned substantially on the same plane. Alternatively, the circumferential wall 31 may protrude from the front surface of the protection panel 12. The protection panel 12 is separated from the second supporting pieces 45.

The protection panel 12 is a sheet glass having a substantially quadrangular shape corresponding to the shape of the opening portion 38. However, the protection panel 12 is not limited thereto, and may be made of other materials such as synthetic resin. The protection panel 12 is thicker, harder, and more resistant to damages than the display 21. A tablet 10 having such a protection panel 12 is more rigid and stronger than a tablet without the protection panel 12. The protection panel 12 is not limited to such a protection panel.

The protection panel 12 is fitted into the opening portion 38, and surrounded by the circumferential wall 31. The protection panel 12 covers the opening portion 38. In other words, the opening portion 38 is covered by the protection panel 12. The protection panel 12 covers the opening portion 38 at least partially. A space may be provided between the protection panel 12 and the inner circumferential face 38a of the opening portion 38. The protection panel 12 protects and supports the display 21, and suppresses bending of the display 21. To put the explanation in another way, the first supporting faces 42 support the protection panel 12 covering the opening portion 38.

As illustrated in FIG. 2, the screen 21a of the display 21 faces the protection panel 12. The screen 21a is a surface substantially perpendicular to the Z axis, but may intersect with the Z axis diagonally. The protection panel 12 comprises a transparent portion covering the screen 21a, and a colored portion covering the other portion of the module 13 such as the printed circuit board 22. A user views an image displayed on the screen 21a through the protection panel 12. The other portion of the module 13 is hidden in a manner covered by the colored portion.

Alternatively, the protection panel 12 may also be fixed to the rear surface of the display 21 (the surface on the opposite side of the screen 21a), without covering the screen 21a. In other words, the protection panel 12 is not limited to a member covering the screen 21a of the display 21.

As illustrated in FIG. 4, a second double-sided adhesive tape 49 is stuck on each of the second supporting faces 46. The second double-sided adhesive tape 49 may also be referred to as an adhesive portion, an adhesive layer, a buffering portion, or an interposed portion, for example. Alternatively, the double-sided adhesive tape may be stuck across the second supporting faces 46, or an adhesive agent may be applied on the second supporting faces 46.

The second supporting faces 46 of the respective second supporting pieces 45 support the base member 16 via the second double-sided adhesive tape 49. The base member 16 is bonded to the second supporting face 46 by the second double-sided adhesive tape 49. Alternatively, the base member 16 may be fixed to the second supporting face 46 using other means, e.g., using a screw. Furthermore, the base member 16 may be fixed to the inner circumferential face 38a of the opening portion 38. The front surface of the base member 16 and the second end portion 37 of the circumferential wall 31 are positioned substantially on the same plane. Alternatively, the circumferential wall 31 may protrude from the front surface of the base member 16. The base member 16 is separated from the first supporting pieces 41.

The base member 16 is made of a magnesium alloy, and has a quadrangular plate-like shape, for example. Alternatively, the base member 16 may be made of other metals such as aluminum alloy, or other materials such as synthetic resin. The base member 16 has a substantially quadrangular shape corresponding to the shape of the opening portion 38. The base member 16 is fitted into the opening portion 38, and surrounded by the circumferential wall 31. The base member 16 covers the opening portion 38. In other words, the opening portion 38 is covered by the base member 16. The base member 16 covers the opening portion 38 at least partially. A space may be provided between the base member 16 and the inner circumferential face 38a of the opening portion 38. To put the explanation in another way, the second supporting faces 46 support the base member 16 covering the opening portion 38. The module 13 is surrounded by the frame member 15, and positioned between the protection panel 12 and the base member 16.

The frame member 15 is manufactured by die-casting, for example. If the first supporting pieces 41 overlap with the second supporting pieces 45 in the width direction of the circumferential wall 31, it might be difficult to remove the frame member 15 from the die (the die moves in the width direction of the circumferential wall 31, for example). However, the second supporting pieces 45 are positioned offset from the respective first supporting pieces 41 in the direction from the first end portion 36 toward the second end portion 37 (the width direction of the circumferential wall 31). Therefore, the frame member 15 can be easily removed from the die. Alternatively, the frame member 15 may be manufactured by other processes such as casting, injection molding, forging, or cutting.

In the tablet 10 according to the first embodiment, the protection panel 12 is supported by the first supporting faces 42 of the respective first supporting pieces 41, and the base member 16 is supported by the second supporting faces 46 of the respective second supporting pieces 45. As mentioned earlier, the frame member 15 having the first supporting pieces 41 and the second supporting pieces 45 can be manufactured by die-casting. Therefore, the frame member 15 can be manufactured easily using a highly stiff metal material, for example. Furthermore, the frame member 15 supports the protection panel 12 and the base member 16 on the light-weighted first supporting pieces 41 and second supporting pieces 45. The tablet 10 having such a frame member 15 is strong, light-weighted, and manufactured inexpensively. Furthermore, the protection panel 12 and the base member 16 can be removed from the frame member 15 easily, for the purpose of maintenance or the like.

A second embodiment will now be explained with reference to FIGS. 5 to 8. In the explanations of a plurality of embodiments provided hereunder, components having the same functions as those having already explained are assigned with the same reference numerals as those of the elements having already explained, and explanations thereof are sometimes omitted hereunder. Furthermore, a plurality of elements having the same reference numerals do not necessarily need to share all of the functions and properties, and may have different functions and properties corresponding to the embodiment.

Figure 5:
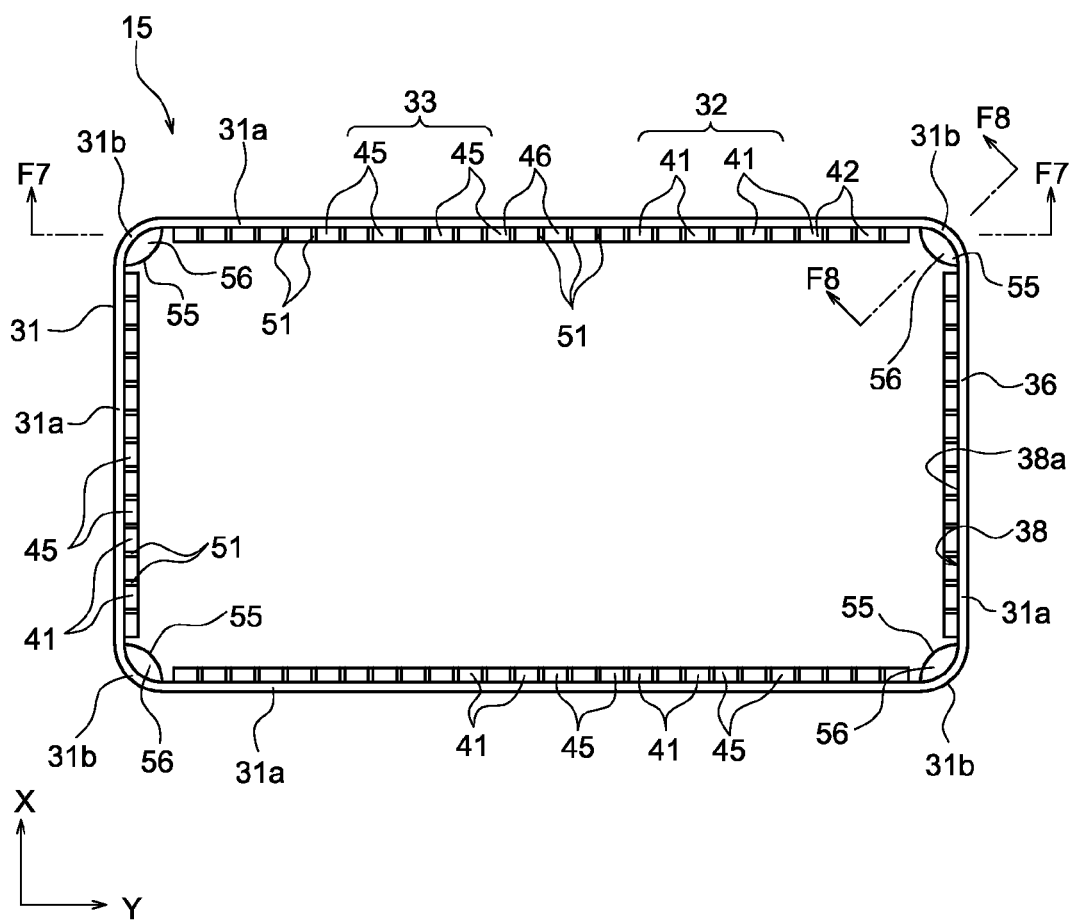
FIG. 5 is an exemplary plan view illustrating a frame member according to a second embodiment.
Figure 6:
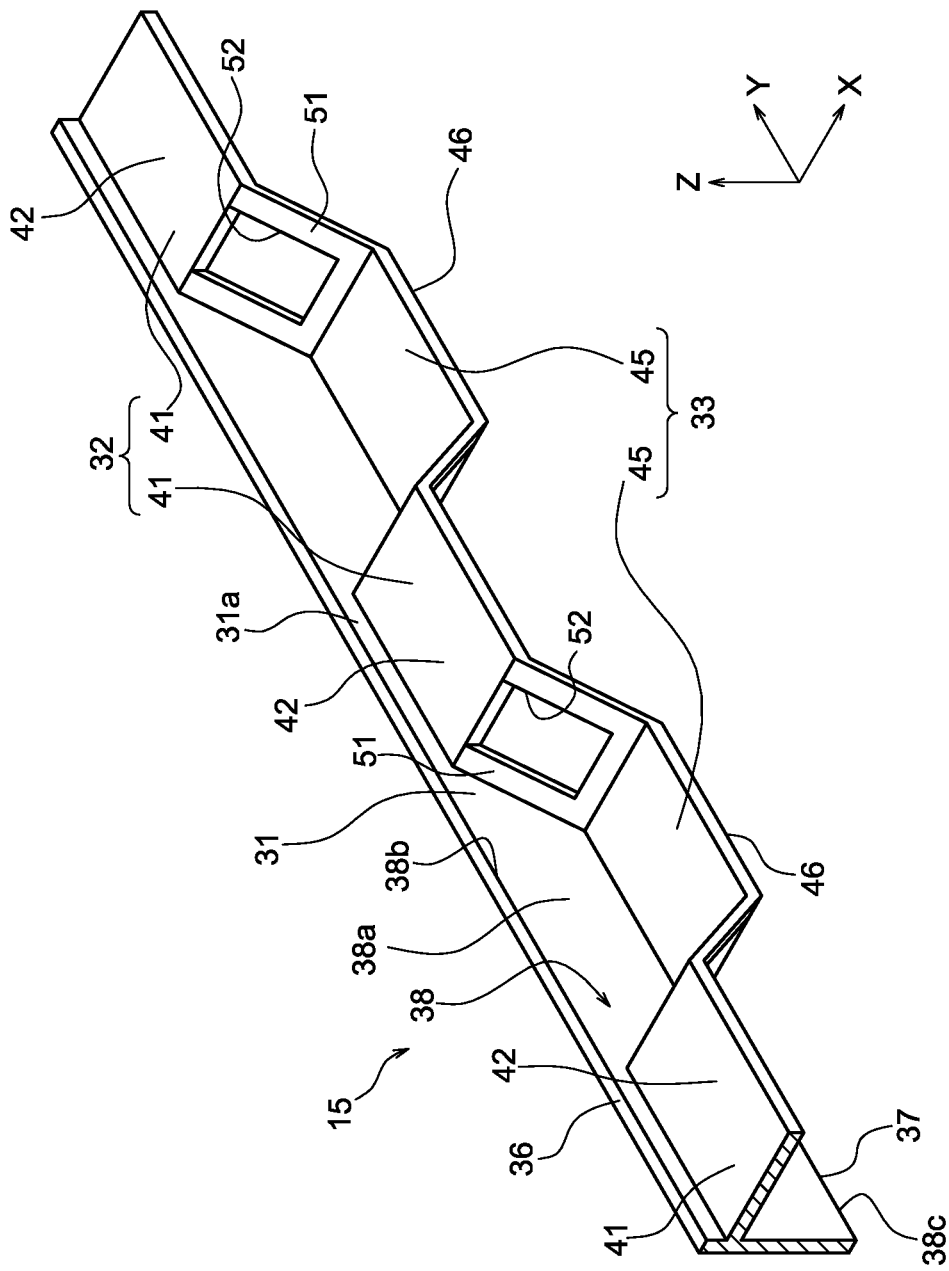
FIG. 6 is an exemplary perspective view illustrating a portion of a frame member in the second embodiment.

FIG. 5 is a plan view illustrating the frame member 15 in the second embodiment. FIG. 6 is a perspective view illustrating a portion of the frame member 15 in the second embodiment. As illustrated in FIGS. 5 and 6, the frame member 15 comprises a plurality of connecting portions 51. The connecting portions 51 may also be referred to as connectors, protrusions, walls, extended portions, running portions, or intermediate portions, for example.

As illustrated in FIG. 6, each of the connecting portions 51 has a quadrangular plate-like shape, and protrudes from the inner circumferential face 38a of the opening portion 38. The connecting portion 51 extends from an end of the corresponding first supporting piece 41 toward an end of the second supporting piece 45 adjacent to the first supporting piece 41. One end of the connecting portion 51 is connected to the end of the first supporting pieces 41. The other end of the connecting portion 51 is connected to the end of the second supporting piece 45. Alternatively, the connecting portions 51 may be connected to portions other than the ends of the first supporting piece 41 and the second supporting piece 45. The first supporting pieces 41, the second supporting pieces 45, the connecting portions 51, and the circumferential wall 31 are integrated.

Figure 7:
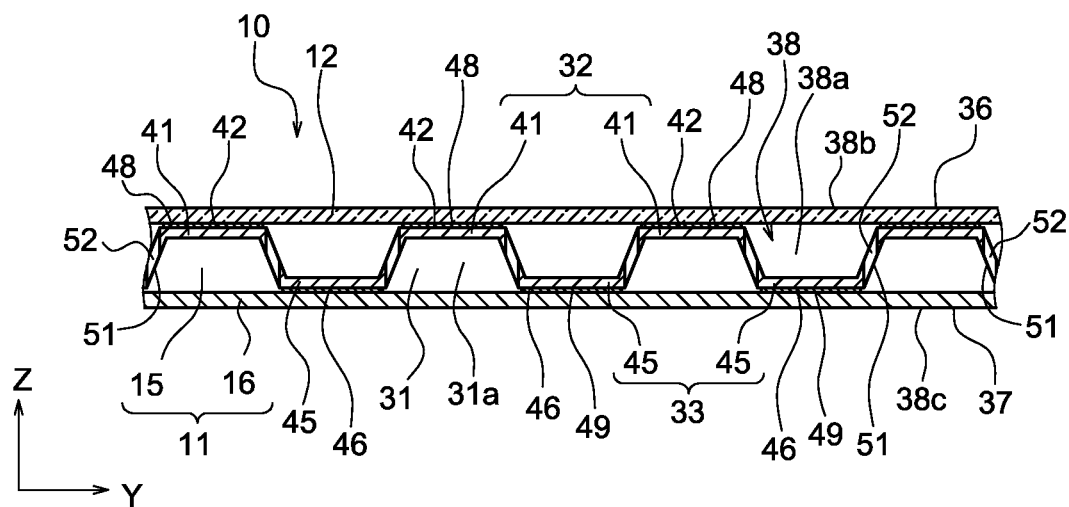
FIG. 7 is an exemplary cross-sectional view illustrating a portion of a tablet taken along a line F7-F7 in FIG. 5, in the second embodiment.

FIG. 7 is a cross-sectional view of a portion of the tablet 10 taken along the line F7-F7 in FIG. 5. As illustrated in FIG. 7, the connecting portion 51 extends diagonally in the direction from the first end portion 36 toward the second end portion 37 of the circumferential wall 31 (the width direction of the circumferential wall 31, the direction extending along the Z axis). In other words, the connecting portions 51 intersects diagonally with the direction from the first end portion 36 toward the second end portion 37 of the circumferential wall 31. The connecting portion 51 is not limited to a linear shape, but may also extend meanderingly.

The connecting portion 51 reinforces the corresponding first supporting piece 41 and second supporting piece 45. When a user, for example, presses the protection panel or the base member 16 in the width direction of the circumferential wall 31, the pressure is applied to the first supporting pieces 41 or the second supporting pieces 45. Such a pressure is distributed across the connecting portions 51 and the second pieces 45 or the first supporting pieces 41, without concentrating on the first supporting pieces 41 or the second supporting pieces 45. Furthermore, the circumferential wall 31 is reinforced because the first supporting pieces 41 and the second supporting pieces 45 are continuous with the connecting portions 51. In other words, the connecting portions 51 reinforce the circumferential wall 31 against a bend and a twist.

Each of the connecting portions 51 is provided with a hole 52. The hole 52 is an example of a lacking portion. Alternatively, a recess, a depressed portion, or a cutout may be the examples of the lacking portion, without limitation to the hole 52. The hole 52 extends in the direction from the first end portion 36 toward the second end portion 37 of the circumferential wall 31 (the direction in which the opening portion 38 extends).

Because the hole 52 is provided, the connecting portions 51 are reduced in weight. Because the hole 52 extends in the direction from the first end portion 36 toward the second end portion 37 of the circumferential wall 31, the hole 52 can be achieved by die-casting, as mentioned above.

As illustrated in FIG. 5, the frame member 15 comprises four supports 55. These supports 55 may also be referred to as protrusions, flanges, tabs, or ribs, for example. The supports 55 are positioned at the respective four corner portions 31b of the circumferential wall 31, and protrude from the inner circumferential face 38a of the opening portion 38. The supports 55 are integrated with the circumferential wall 31.

Each of the supports 55 has an arc shape. Each of the supports 55 is separated from the adjacent first supporting piece 41 and second supporting piece 45. The supports 55 are not limited thereto, and may have a shape extending along the respective corner portions 31b of the circumferential wall 31, or be integrated with the first supporting piece 41 and the second supporting piece 45.

Figure 8:
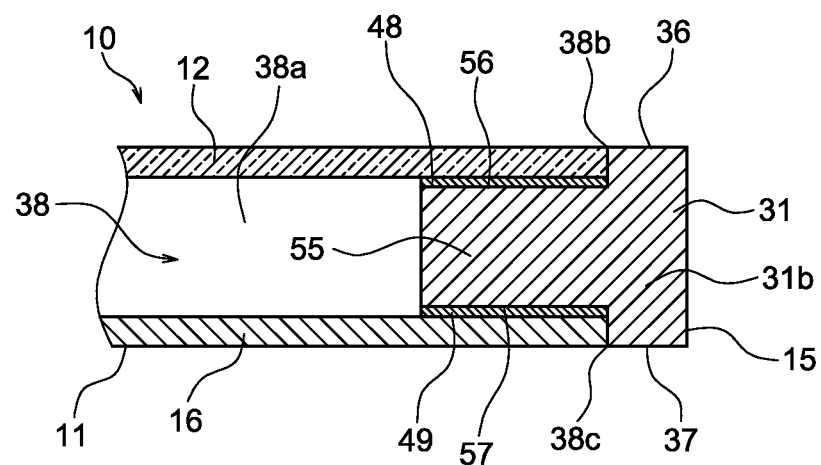
FIG. 8 is an exemplary cross-sectional view illustrating a portion of the tablet taken along a line F8-F8 in FIG. 5, in the second embodiment.

FIG. 8 is a cross-sectional view of a portion of the tablet 10 taken along the F8-F8 line in FIG. 5. As illustrated in FIG. 8, each of the supports 55 has a first supporting face 56 and a second supporting face 57. The first supporting face 56 is a flat surface facing the first end portion 36 of the circumferential wall 31. The first supporting faces 56 are positioned substantially on the same plane as the first supporting faces 42 of the respective first supporting pieces 41. The second supporting face 57 is positioned on the opposite side of the corresponding first supporting face 56. The second supporting face 57 is a flat surface facing the second end portion 37 of the circumferential wall 31. The second supporting faces 57 are positioned substantially on the same plane as the second supporting faces 46 of the respective second supporting pieces 45.

A first double-sided adhesive tape 48 is stuck to the first supporting face 56 of each of the supports 55, in the same manner as the first supporting face 42 of each of the first supporting pieces 41. The corners of the protection panel 12 are supported by the first supporting faces 56 of the respective supports 55 via the first double-sided adhesive tape 48. The protection panel 12 is bonded to the first supporting faces 56 by the first double-sided adhesive tape 48. Alternatively, the protection panel 12 may be fixed to the first supporting face 56 by other means.

A second double-sided adhesive tape 49 is stuck to the second supporting face 57 of each of the supports 55, in the same manner as the second supporting face 46 of each of the second supporting pieces 45. The corners of the base member 16 are supported by the second supporting faces 57 of the respective supports 55 via the second double-sided adhesive tape 49. In other words, the supports 55 support both of the protection panel 12 and the base member 16. The base member 16 is bonded to the second supporting faces 57 by the second double-sided adhesive tape 49. Alternatively, the base member 16 may be fixed to the second supporting face 57 by other means.

In the tablet 10 according to the second embodiment, because the frame member 15 comprises the connecting portions 51, the circumferential wall 31, the first supporting pieces 41, and the second supporting pieces 45 are reinforced. With the hole 52, an weight increase of the tablet 10 by the connecting portions 51 can be suppressed. The supports 55 support both of the corners of the protection panel 12 and the corners of the base member 16.

Figure 9:
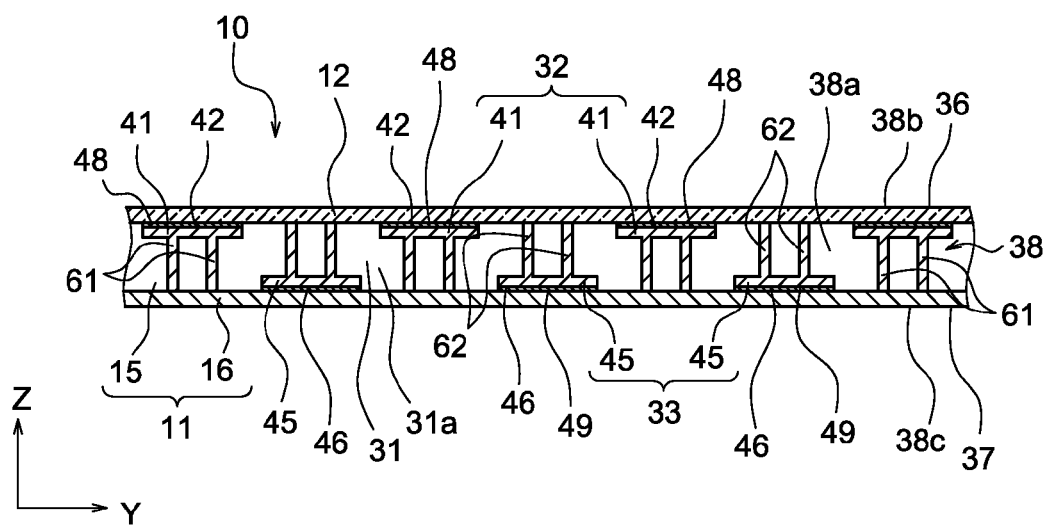
FIG. 9 is an exemplary cross-sectional view illustrating a portion of a tablet according to a third embodiment.

A third embodiment will now be explained with reference to FIG. 9. FIG. 9 is a cross-sectional view illustrating a portion of the tablet 10 according to the third embodiment. As illustrated in FIG. 9, each of the first supporting pieces 41 comprises two first ribs 61. The first ribs 61 are examples of first extended portions. Each of the first ribs 61 has a substantially quadrangular plate-like shape. The number and the shape of the first rib 61 are not limited thereto.

The first ribs 61 extend toward the second end portion 37 of the circumferential wall 31. In other words, the first ribs 61 extend in the direction in which the opening portion 38 extends. Ends of the respective first ribs 61 facing the second end portion 37 are positioned substantially on the same plane as the second supporting faces 46 of the respective second supporting pieces 45. The base member 16 mounted on the second supporting faces 46 is supported by such ends of the respective first ribs 61. The first ribs 61 may also support the base member 16 via the second double-sided adhesive tape 49, for example.

Each of the second supporting pieces 45 has two second ribs 62. The second ribs 62 are examples of second extended portions. Each of the second ribs 62 has a substantially quadrangular plate-like shape. The number and the shape of the second ribs 62 are not limited thereto.

The second ribs 62 extend toward the first end portion 36 of the circumferential wall 31. In other words, the second ribs 62 extend in the direction in which the opening portion 38 extends. Ends of the respective second rib 62 facing the first end portion 36 are positioned substantially on the same plane as the first supporting faces 42 of the respective first supporting pieces 41. The protection panel 12 mounted on the first supporting face 42 is supported by such ends of the respective second ribs 62.

In the tablet 10 according to the third embodiment, the first ribs 61 and the second ribs 62 reinforce the corresponding first supporting piece 41 and second supporting piece 45, respectively. In other words, when a user presses the protection panel 12 or the base member 16, for example, the first supporting pieces 41 and the second ribs 62 support the protection panel 12, or the second supporting pieces 42 and the first rib 61 supports the base member 16. Furthermore, the first ribs 61 and the second ribs 62 respectively support the first supporting pieces 41 and the second supporting pieces 45 on which the pressing pressure is exerted.

Figure 10:
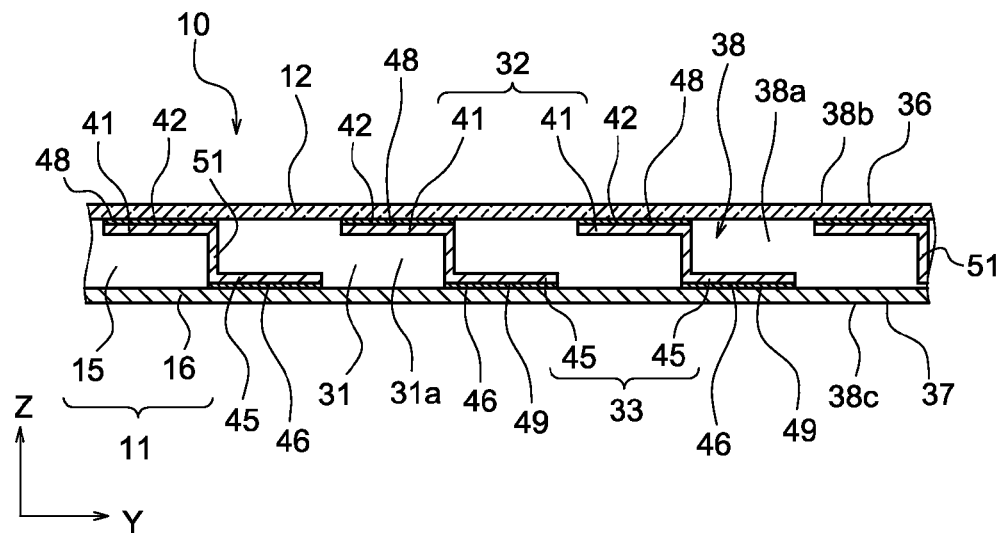
FIG. 10 is an exemplary cross-sectional view illustrating a portion of a tablet according to a fourth embodiment.

A fourth embodiment will now be explained with reference to FIG. 10. FIG. 10 is a cross-sectional view illustrating a portion of the tablet 10 according to the fourth embodiment. As illustrated in FIG. 10, the frame member 15 comprises a plurality of the connecting portions 51.

Each of the connecting portions 51 in the fourth embodiment extends in the direction from the first end portion 36 toward the second end portion 37 of the circumferential wall (the width direction of the circumferential wall 31, the direction extending along the Z axis). In other words, each of the connecting portions 51 extends substantially perpendicularly to the first supporting faces 42 and the second supporting faces 46. Furthermore, the connecting portion 51 is connected to one of the first supporting pieces 41, and to one of two of the second supporting pieces 45 that are adjacent to the first supporting piece 41.

In the tablet 10 according to the fourth embodiment, each of the connecting portions 51 extends in the direction from the first end portion 36 toward the second end portion 37 of the circumferential wall 31. In this manner, the circumferential wall 31, the first supporting pieces 41, and the second supporting pieces 45 are reinforced.

Figure 11:
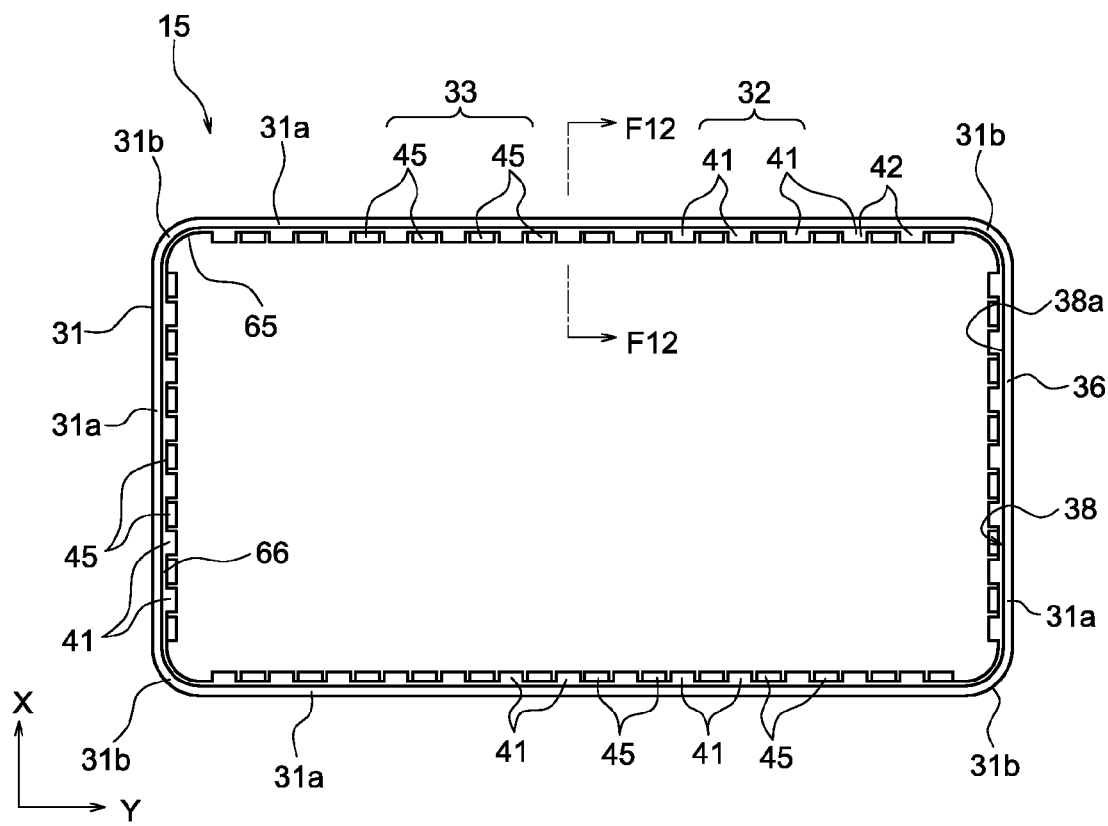
FIG. 11 is an exemplary plan view illustrating a frame member according to a fifth embodiment.
Figure 12:
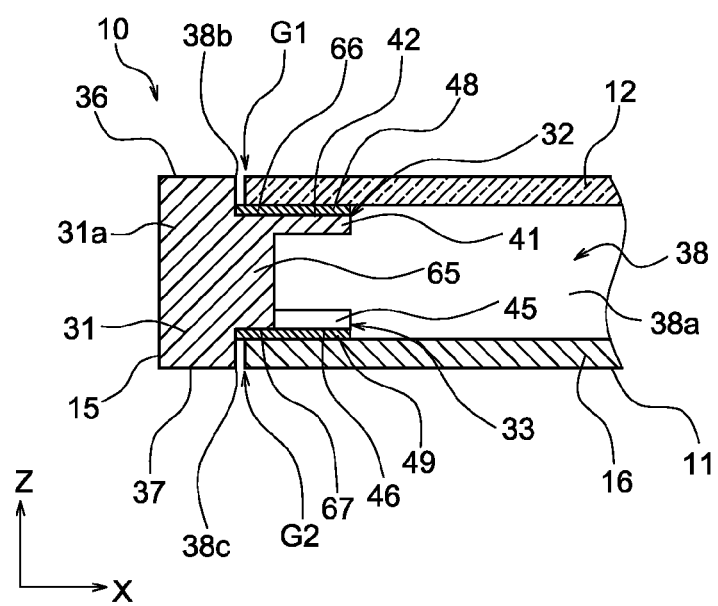
FIG. 12 is an exemplary cross-sectional view illustrating a portion of a tablet taken along a line F12-F12 in FIG. 11, in the fifth embodiment.

A fifth embodiment will now be explained with reference to FIGS. 11 and 12. FIG. 11 is a plan view illustrating the frame member 15 according to the fifth embodiment. FIG. 12 is a cross-sectional view of a portion of the tablet 10 taken along the F12-F12 line in FIG. 11. As illustrated in FIG. 11, the frame member 15 comprises an extended portion 65. The extended portion 65 is an example of a third support, and may also be referred to as a protrusion, a wall, a tab, a rib, a flange, an extending portion, or a running portion, for example.

The extended portion 65 is provided across the entire circumference of the inner circumferential face 38a of the opening portion 38, and protrudes from the inner circumferential face 38a. In other words, the extended portion 65 is provided across the four plate portions 31a and the four corner portions 31b of the circumferential wall 31. Alternatively, the extended portion 65 may also be partly not continuous.

The extended portion 65 protrudes shorter than the first supporting pieces 41 and the second supporting pieces 45. The extended portion 65 is integrated with the first supporting pieces 41 and the second supporting pieces 45. Alternatively, the extended portion 65 may be separated from the first supporting pieces 41 and the second supporting pieces 45. As illustrated in FIG. 12, the first supporting pieces 41 and the second supporting pieces 45 protrude from the inner circumferential surface of the extended portion 65.

The extended portion 65 comprises a third supporting face 66 and a fourth supporting face 67. The third supporting face 66 is a flat surface facing the first end portion 36 of the circumferential wall 31. The third supporting face 66 is continuous with the first supporting faces 42 of the respective first supporting pieces 41. In other words, the first supporting pieces 41 and the extended portion 65 form one flat surface (the first supporting faces 42 and the third supporting face 66).

A first double-sided adhesive tape 48 is stuck to the third supporting face 66, in the same manner as the first supporting faces 42 of the respective first supporting pieces 41. The protection panel 12 is supported by the third supporting face 66 via the first double-sided adhesive tape 48. The protection panel 12 is bonded to the third supporting face 66 by the first double-sided adhesive tape 48.

There might be a gap G1 between the protection panel 12 and the inner circumferential face 38a of the opening portion 38. Such a gap G1 is covered by the extended portion 65. Therefore, a user is suppressed from looking inside of the tablet 10 through the gap G1. The gap G1 may have a portion through which the inside of the tablet 10 is allowed to be looked.

The fourth supporting face 67 is a flat surface facing the second end portion 37 of the circumferential wall 31. The fourth supporting face 67 is continuous with the second supporting faces 46 of the respective second supporting pieces 45. In other words, the second supporting pieces 45 and the extended portion 65 form one flat surface (the second supporting faces 46 and the fourth supporting face 67).

A second double-sided adhesive tape 49 is stuck to the fourth supporting face 67, in the same manner as the second supporting faces 46 of the respective second supporting pieces 45. The base member 16 is supported by the fourth supporting face 67 via the second double-sided adhesive tape 49. In other words, the extended portion 65 supports both of the protection panel 12 and the base member 16. The base member 16 is bonded to the fourth supporting face 67 by the second double-sided adhesive tape 49.

There might be a gap G2 between the base member 16 and the inner circumferential face 38a of the opening portion 38. Such a gap G2 is covered by the extended portion 65. Therefore, a user is suppressed from looking inside of the tablet 10 through the gap G2. The gap G2 may have a portion through which the inside of the tablet 10 is allowed to be looked.

In the tablet 10 according to the fifth embodiment, the extended portion 65 is provided across the entire circumference of the inner circumferential face 38a of the opening portion 38, protrudes from the inner circumferential face 38a, and supports the protection panel 12 and the base member 16. Because the extended portion 65 covers the gap G1, G2, a user is suppressed from looking inside of the tablet 10. Furthermore, the extended portion 65 can suppress liquid or dusts from entering the tablet 10.

Figure 13:
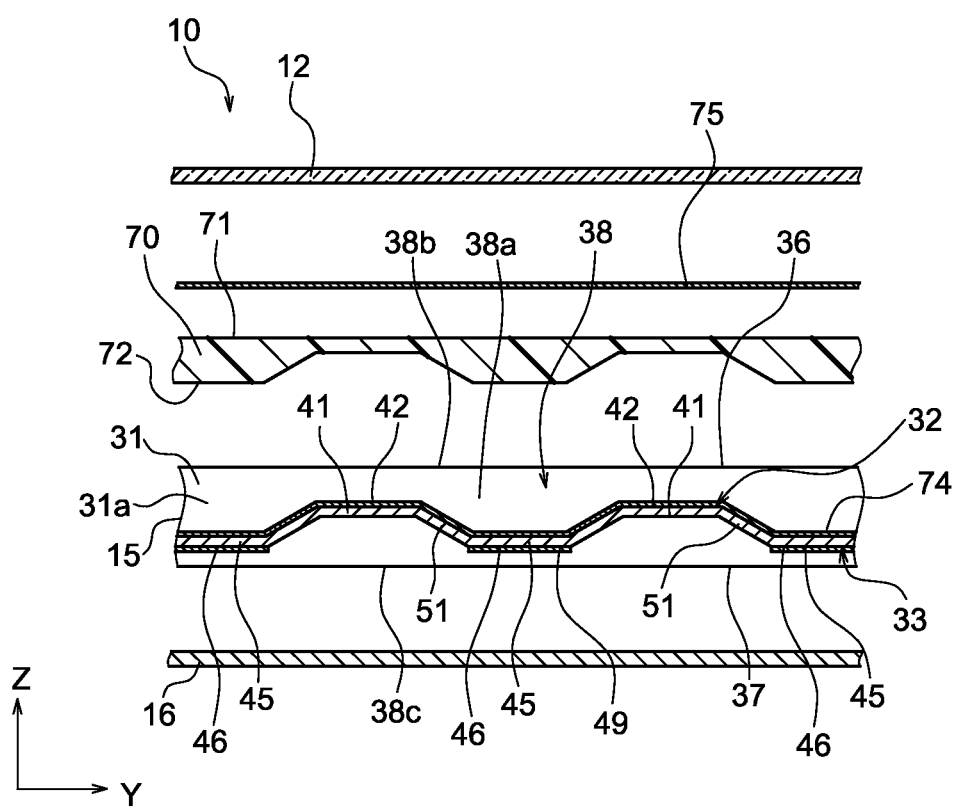
FIG. 13 is an exemplary exploded cross-sectional view of a portion of a tablet according to a sixth embodiment.

A sixth embodiment will now be explained with reference to FIG. 13. FIG. 13 is an exploded cross-sectional view illustrating a portion of the tablet 10 according to the sixth embodiment. As illustrated in FIG. 13, the tablet 10 further comprises an intermediate member 70. The intermediate member 70 may also be referred to as a reinforcing member, a mount member, or a member, for example.

The intermediate member 70 is made of a synthetic resin, for example. The intermediate member 70 is less rigid than the frame member 15, and is also less rigid than the base member 16. The intermediate member 70 may be made of other materials, may be more rigid than the frame member 15, or may be more rigid than the base member 16.

The intermediate member 70 has a substantially quadrangular frame-like shape corresponding to the shape of the opening portion 38. The intermediate member 70 can be fitted into the opening portion 38. The intermediate member 70 is kept in contact with the inner circumferential face 38a of the opening portion 38 with a slight gap therebetween. The intermediate member 70 extends along the inner circumferential face 38a of the opening portion 38. Alternatively, the intermediate member 70 may also be a plurality of members extending along the inner circumferential face 38a of the opening portion 38.

The intermediate member 70 comprises a first joint face 71 and a second joint face 72. The second joint face 72 is an example of the third face. The second joint face 72 is positioned on the opposite side of the first joint face 71.

The first joint face 71 is a substantially wave-shaped surface corresponding to the first supporting pieces 41, the second supporting pieces 45, and the connecting portions 51. The first joint face 71 faces the first supporting pieces 41, the second supporting pieces 45, and the connecting portions 51.

The first joint face 71 is stuck to the first supporting pieces 41, the second supporting pieces 45, and the connecting portions 51 with a third double-sided adhesive tape 74. The third double-sided adhesive tape 74 may also be referred to as an adhesive portion, an adhesive layer, a buffering portion, or an interposed portion, for example. Alternatively, the first joint face 71 may be bonded to the first supporting pieces 41, the second supporting pieces 45, and the connecting portions 51 by different means, such as adhesive agent.

The second joint face 72 is a flat surface that is substantially in parallel with the first supporting faces 42 of the respective first supporting pieces 41. The second joint face 72 faces the protection panel 12. The second joint face 72 is bonded to the protection panel 12 with a fourth double-sided adhesive tape 75. The fourth double-sided adhesive tape 75 may also be referred to as an adhesive portion, an adhesive layer, a buffering portion, or an interposed portion, for example. The protection panel 12 is supported by the second joint face 72 via the fourth double-sided adhesive tape 75.

As described above, the intermediate member 70 is interposed between the first supporting faces 42 of the respective first supporting pieces 41 and the protection panel 12. The protection panel 12 is supported by and is fixed to the first supporting faces 42 of the respective first supporting pieces 41 via the intermediate member 70, the third double-sided adhesive tape 74, and the fourth double-sided adhesive tape 75. The area of the second joint face 72 is larger than the area of the first supporting faces 42 of all of the first supporting pieces 41.

The intermediate member 70 may be bonded to the protection panel 12 in advance, before the protection panel 12 is mounted on the frame member 15. This enables the protection panel 12 to be aligned easily. Furthermore, the protection panel 12 and the intermediate member 70 may be manufactured integrally. In such a case, the protection panel 12 and the intermediate member 70 are made integrally of a synthetic resin, for example.

In the tablet 10 according to the sixth embodiment, the intermediate member 70 is interposed between the protection panel 12 and the first supporting faces 42 of the respective first supporting pieces 41. Because the second joint face 72 supports the protection panel 12, the supported area of the protection panel 12 is increased. In other words, because a large area of the protection panel 12 is bonded to the intermediate member 70, the protection panel 12 is firmly fixed to the intermediate member 70.

Figure 14:
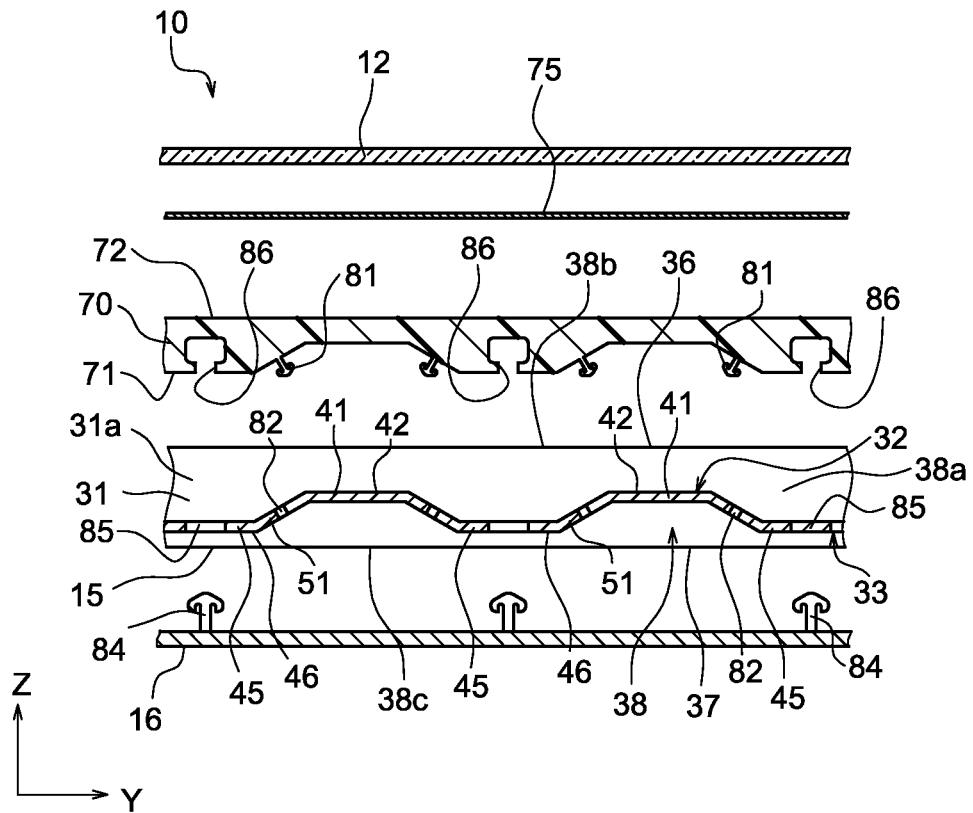
FIG. 14 is an exemplary exploded cross-sectional view of a portion of a tablet according to a seventh embodiment.

A seventh embodiment will now be explained with reference to FIG. 14. FIG. 14 is a cross-sectional view illustrating a portion of the tablet 10 according to the seventh embodiment. As illustrated in FIG. 14, in the seventh embodiment, the intermediate member 70 comprises a plurality of first hooks 81. The first hooks 81 are example of a first hooking portion. The first hooks 81 protrude from the first joint face 71. The first hooks 81 are elastically deformable.

The connecting portions 51 comprises a plurality of first hooked holes 82. The first hooked holes 82 are examples of a second hooking portion. The first hooked holes 82 are provided at positions corresponding to the first hooks 81. Each of the first hooks 81 is inserted into the corresponding first hooked hole 82, and is elastically hooked onto the first hooked hole 82. In this manner, the intermediate member 70 is fixed to the frame member 15.

The base member 16 comprises a plurality of second hooks 84. The second hooks 84 are examples of a fourth hooking portion. Each of the second hooks 84 protrudes toward the corresponding second supporting piece 45. Alternatively, each of the second hooks 84 may face other portions, such as the first supporting piece 41 or the connecting portion 51.

The second supporting pieces 45 comprise a plurality of insertion holes 85, respectively. A cutout may be provided to the second supporting piece 45, for example, without limitation to the insertion hole 85. The insertion hole 85 is provided at a position corresponding to the second hook 84. The second hook 84 is allowed to pass through the insertion hole 85 without being interrupted.

The intermediate member 70 further comprises a plurality of second hooked holes 86. The second hooked holes 86 are examples of a third hooking portion. Each of the second hooked holes 86 is provided at a position corresponding to the second hook 84 and the insertion hole 85. The opening of the second hooked hole 86 has a claw-like shape. The claw-like portion is elastically deformable.

The second hook 84 on the base member 16 is then passed through the corresponding insertion hole 85, and inserted into the corresponding second hooked hole 86. The second hook 84 is then elastically hooked onto the claw-like portion of the second hooked hole 86. In this manner, the base member 16 is fixed to the second supporting pieces 45 and the intermediate member 70. The second supporting pieces 45 are interposed between the base member 16 and the intermediate member 70, and support the base member 16.

In the tablet 10 according to the seventh embodiment, the first hooks 81 are elastically hooked onto the respective first hooked holes 82, and the seconds hooks 84 are elastically hooked onto the respective second hooked holes 86. In this manner, the base member 16 is snap-fitted to the frame member 15, without any double-sided adhesive tape. In other words, the base member 16 made of a metal is mounted on the frame member 15 that is also made of a metal, by allowing the base member 16 to be snap-fitted into the intermediate member 70. The protection panel 12 and the base member 16 can be easily removed from the frame member 15.

The first to fourth hooking portions are not limited to the first hooks 81, the second hooks 84, the first hooked holes 82, and the second hooked holes 86. For example, claws or grooves may be examples of the first to fourth hooking portions.

Figure 15:
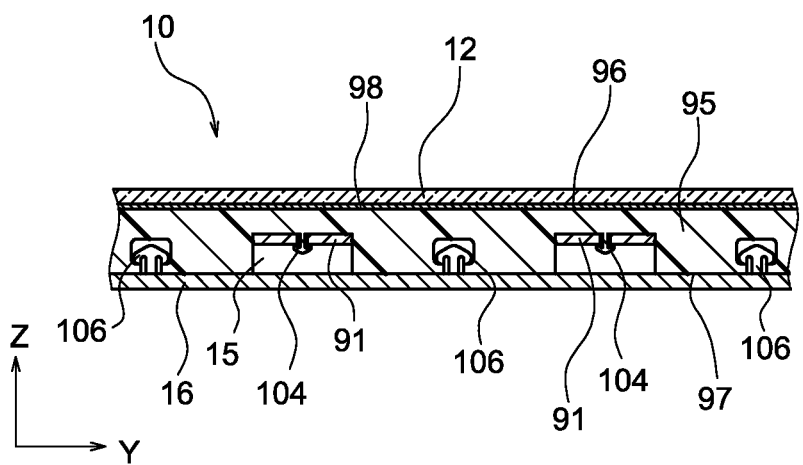
FIG. 15 is an exemplary cross-sectional view illustrating a portion of a tablet according to an eighth embodiment.
Figure 16:
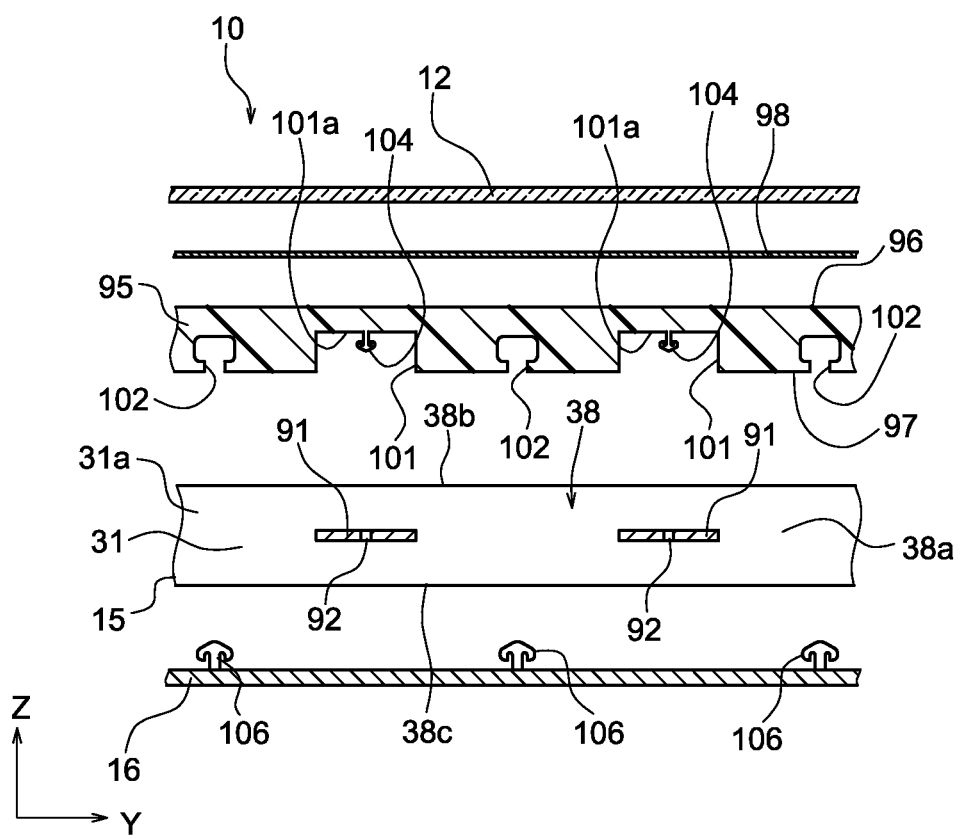
FIG. 16 is an exemplary exploded cross-sectional view of the portion of the tablet in the eighth embodiment.

An eighth embodiment will now be explained with reference to FIGS. 15 and 16. FIG. 15 is a cross-sectional view illustrating a portion of the tablet 10 according to the eighth embodiment. FIG. 16 is an exploded cross-sectional view illustrating the portion of the tablet 10.

As illustrated in FIG. 16, the frame member 15 comprises a plurality of supporting portions 91. The supporting portions 91 may also be referred to as intermediate members, connecting members, fixing members, attaching members, or members, for example. The supporting portions 91 protrude from the inner circumferential face 38*a* of the opening portion 38. Each of the supporting portions 91 has a quadrangular plate-like shape, but may have other shapes. Each of the supporting portions 91 has a third hooked hole 92.

The tablet 10 further comprises a mount member 95. The mount member 95 is a part made of synthetic resin, for example. The mount member 95 is elastically deformable.

The mount member 95 has a substantially quadrangular frame-like shape, corresponding to the shape of the opening portion 38. The mount member 95 can be fitted into the opening portion 38. The mount member 95 is kept in contact with the inner circumferential face 38*a* of the opening portion 38 with a slight gap therebetween. In other words, the mount member 95 extends along the inner circumferential face 38*a* of the opening portion 38.

The mount member 95 has a first end face 96 and a second end face 97. The first end face 96 is a flat surface facing the protection panel 12. The first end face 96 is bonded to the protection panel 12 by a double-sided adhesive tape 98, for example. The double-sided adhesive tape 98 may also be referred to as an adhesive portion, an adhesive layer, a buffering portion, or an interposed portion, for example. The first end face 96 supports the protection panel 12.

The second end face 97 is a flat surface positioned on the opposite side of the first end face 96, and facing the base member 16. The second end face 97 is provided with a plurality of depressed portions 101 and a plurality of fourth hooked holes 102.

The depressed portions 101 are provided correspondingly to the supporting portions 91. Each of the supporting portions 91 is fitted into the corresponding depressed portion 101, and brought into contact with a bottom portion 101*a* of the depressed portion 101. The supporting portions 91 support the protection panel 12 via the mount member 95.

A third hook 104 protrudes from the bottom portion 101*a* of each of the depressed portion 101. The third hooks 104 are provided correspondingly to the third hooked hole 92 of the supporting portion 91. The third hooks 104 are elastically deformable. Each of the third hooks 104 is inserted into the corresponding third hooked hole 92, and elastically hooked onto the third hooked hole 92. In this manner, the mount member 95 is fixed to the supporting portions 91.

The opening of each of the fourth hooked holes 102 has a claw-like shape. The claw-like portion is elastically deformable.

The base member 16 is provided with a plurality of fourth hooks 106. The fourth hooks 106 are positioned correspondingly to the fourth hooked holes 102. Each of the fourth hooks 106 is inserted into the corresponding fourth hooked hole 102, and is elastically hooked onto the claw-like portion of the fourth hooked hole 102. In this manner, the base member 16 is fixed to the mount member 95. The base member 16 is supported by the second end face 97.

In the tablet 10 according to the eighth embodiment, the mount member 95 is mounted on the supporting portions 91 of the frame member 15, and the protection panel 12 and the base member 16 are mounted on the mount member 95.

The exemplary electronic device in the embodiments is explained to be a tablet 10, but the electronic device is not limited thereto. Various devices, such as a portable computer, a display, a television receiver, a smartphone, a mobile phone, a mobile game machine, and a car navigation system may be examples of the electronic device. Furthermore, the second member is not limited to a member allowing light to pass through such as the protection panel 12.

According to at least one of the embodiments described above, a first member comprises a first support configured to support a second member, and a second support configured to support a third member, and the second support is positioned offset from a position overlapping with the first support. In this manner, a strong, light, and easy-to-manufacture electronic device can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a side wall portion comprising:
      a first end;
      a second end on an opposite side of the first end;
      an opening between the first end and the second end;
      a first support configured to protrude from an inner circumferential face of the opening and comprising a first face facing the first end; and
      a second support configured to protrude from the inner circumferential face of the opening at a position nearer to the second end than the first support, comprising a second face facing the second end portion, and being positioned at an offset with respect to the first support along a circumferential direction of the opening;
      a third support configured to protrude less than the first support from the inner circumferential face of the opening and comprising a third face facing the first end,
   a first panel configured to be supported by the first face of the first support and the third face of the third support; and
   a second panel configured to be supported by the second face of the second support.

2. The electronic device of claim 1, wherein the first panel is configured to be bonded to the first face of the first support.

3. The electronic device of claim 1, wherein the side wall portion further comprises a connecting portion configured to be connected to the first support and the second support.

4. The electronic device of claim 3, wherein the connecting portion extends in the direction from the first end to the second end.

5. The electronic device of claim 3, wherein the connecting portion is slanted with respect to the first end and the second end.

6. The electronic device of claim 5, wherein the connecting portion comprises a lacking portion passing through the connecting portion in the direction from the first end to the second end.

7. The electronic device of claim 1, wherein
   the third support is configured to protrude less than the second support, and comprises a fourth face facing the second end, and
   the second panel is configured to be supported by the fourth face.

8. The electronic device of claim 7, wherein the third face is configured to form a single flat surface with the first face.

9. The electronic device of claim 8, wherein the fourth face is configured to form a single flat surface with the second face.

10. The electronic device of claim 9, wherein the third support is provided across an entire circumference of the inner circumferential face of the opening.

11. The electronic device of claim 10, wherein the third support is configured to cover a gap between the first panel and the inner circumferential face of the opening.

12. The electronic device of claim 11, wherein the third support is configured to cover a gap between the second panel and the inner circumferential face of the opening.

13. The electronic device of claim 1, wherein
   the first support further comprises a first extended portion extending toward the second end, and
   an end of the first extended portion toward the second end is configured to support the second panel.

14. The electronic device of claim 13, wherein
   the second support further comprises a second extended portion extending toward the first end, and
   an end of the second extended portion toward the first end is configured to support the first panel.

15. The electronic device of claim 1, wherein
   the first support comprises a plurality of first supporting pieces each comprising the first face,
   the second support comprises a plurality of second supporting pieces each comprising the second face, and
   the first supporting pieces and the second supporting piece are positioned alternatingly along a circumferential direction of the opening.

16. The electronic device of claim 1, further comprising an intermediate member configured to be interposed between the first face and the first panel and be mounted to the first panel.

17. The electronic device of claim 16, wherein the intermediate member comprises a third face comprising a larger area than the first face and is configured to support the first panel.

18. The electronic device of claim 16, wherein
   the intermediate member comprises a first hooking portion, and
   the first member comprises a second hooking portion configured to elastically hook onto the first hooking portion.

19. The electronic device of claim 18, wherein
   the intermediate member comprises a third hooking portion, and
   the third member comprises a fourth hooking portion configured to elastically hook onto the third hooking portion.

* * * * *